United States Patent [19]

Stauber

[11] Patent Number: 5,022,264

[45] Date of Patent: Jun. 11, 1991

[54] INSTRUMENT FOR MEASURING ACCELERATIONS, PARTICULARLY GRAVITATION COMPONENTS FOR GONIOMETRY

[75] Inventor: Siegfried T. Stauber, Zürich, Switzerland

[73] Assignee: Wyler AG, Winterthur, Switzerland

[21] Appl. No.: 434,437

[22] Filed: Nov. 8, 1989

[30] Foreign Application Priority Data

Nov. 7, 1988 [CH] Switzerland .................... 04125/88

[51] Int. Cl.$^5$ .............................................. H01G 7/00
[52] U.S. Cl. .............................. 73/382 R; 73/517 R; 73/497; 361/280
[58] Field of Search ............... 73/517 R, 497, 382, 73/382 G; 331/66; 361/280

[56] References Cited

U.S. PATENT DOCUMENTS

| | | | |
|---|---|---|---|
| 2,767,973 | 10/1956 | TerVeen et al. | 264/1 |
| 4,483,194 | 11/1984 | Rudolf | 73/517 R |
| 4,581,676 | 4/1986 | Baxter et al. | 361/283 |
| 4,758,821 | 7/1988 | Nelson et al. | 340/347 |

OTHER PUBLICATIONS

Herman K. P. Neubert, Instrument Transducers, 1963 and 1975, pp. 34–39, 264 and 51, Oxford at the Clarendon Press (book).
Foldvari, Tibor et al., Capacitive Transducers, Nov. '64, edition of Instruments and Control Systems, pp. 77–85.

*Primary Examiner*—Hezron E. Williams
*Assistant Examiner*—Craig Miller
*Attorney, Agent, or Firm*—Ladas & Parry

[57] ABSTRACT

For the measurement of accelerations, e.g. gravitation components for goniometry, in the oscillating circuit of two RC oscillators capacitors are provided, which in a common, metallic casing between two electrode plates (2,3) have a spring-elastically held, common, circular deflection part. In order to avoid dielectric interference, the electronic means are arranged on one side of the instrument, are surrounded by a metallic cover and their electrical connection to the more remote electrode plate takes place by a wire, which is passed in contact-free manner through a central hole in the circular deflection part and the closer electrode plate. The spacing between the deflection part and the electrode plates remains constant in the case of a non-deflected deflection part, in that its size forms a ratio $E - M : M$ to the thickness of the spacers insulating the electrode plates from the metallic casing, $E$ corresponding to the thermal expansion coefficient of the spacers and $M$ to that of the metallic casing.

13 Claims, 1 Drawing Sheet

INSTRUMENT FOR MEASURING ACCELERATIONS, PARTICULARLY GRAVITATION COMPONENTS FOR GONIOMETRY

BACKGROUND OF THE INVENTION

The invention relates to an instrument for measuring accelerations, particularly gravitation components for goniometry or angular measurements based on the deflection of a circular, metallic deflection part, which for forming two adjacent capacitors is held in spring-elastics, membrane-like spaced manner between two capacitor plates and between two parts of a common casing.

An instrument of this type is known from U.S. Pat. No. 4,023,413. Its measurement principle is based on the measurement of voltage changes caused in the associated circuits through capacitance changes to the two capacitors.

SUMMARY OF THE INVENTION

The problem of the present invention is to provide an instrument of the aforementioned type which, in the case of small dimensions and a robust, compact construction, particularly when transmitting the measurement signal over long distances, has a higher measuring accuracy with a greater resolution of the measured value display.

According to the invention this problem is solved in that the capacitors are in each case arranged in the oscillating circuit of a RC oscillator and the RC oscillators are connected to a digital computer which, converts the frequency changes occurring due to the deflection, into a measurement signal.

For a computational compensation of interference acting on oscillators, such as e.g. due to temperature changes, there is additionally at least one reference oscillator, which is designed for a constant oscillation frequency.

The oscillators are preferably chosen in such a way that their current consumption is less than 1 mA in the case of a supply voltage of more than 2 V. Thus, no significant temperature changes are caused by the operating current which could influence the measuring accuracy. In addition, their frequency is preferably lower than 50 kHz and the switching time of the active oscillator element shorter than 500 nS, so that the capacitor charging times are relatively long.

The electronic means of the RC oscillators and the computer are, with the exception of the active capacitors, preferably located on one side of the instrument on a printed circuit board, which is directed parallel to one of the electrode plates.

In order to avoid dielectric interference the other electrode plate is connected to the electronic means in preferred manner by a wire, which is passed in contact-free manner and centrally through the deflection part and the electrode plate.

BRIEF DESCRIPTION OF THE DRAWINGS

Further embodiments of the inventive instrument reducing interference, increasing the measuring accuracy and/or simplifying the production of the instrument form the subject matter of dependent claims, as well as the following description of embodiments with refeence to the drawings, wherein show:

DETAILED DESCRIPTION OF THE INVENTION

Figure 1:
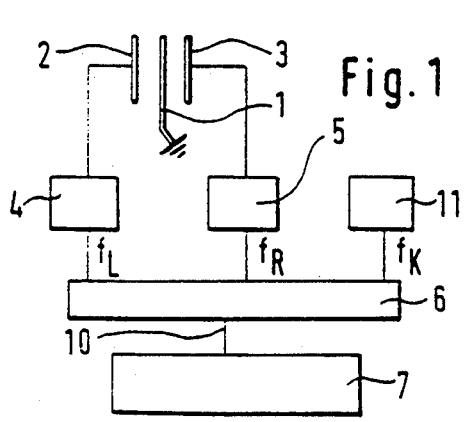
FIG. 1 a functional diagram of the instrument, including its electronic means and its measurement display.

The diagrammatic representation of FIG. 1 shows the deflection part 1 connected to earth or ground. As a result of its arrangement between two electrode plates 2,3, it forms the common component of two parallel, juxtaposed capacitors. The latter are located in the oscillating circuit of RC oscillators 4,5, so that their frequency $f_L$, $f_R$ is determined by the value of their capacitance. This value varies as a result of acceleration forces, which bring about a position change to the deflection part 1 acting in pendulum-like manner relative to electrode plates 2,3. Thus, as a result of a computational evaluation of the change to the frequency $f_L$, $f_R$ in a computer 6 and by a suitable calibration, it is possible to get the determined value of measurement digitally displayed in a display unit 7.

Figure 2:
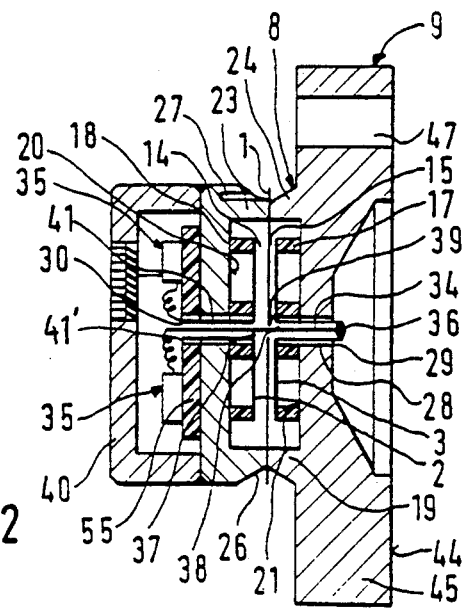
FIG. 2 an axial cross-section through the instrument.
Figure 3:
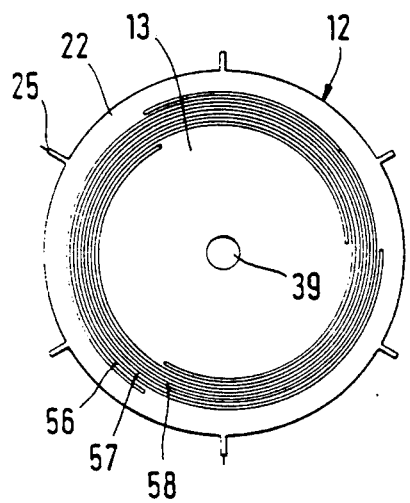
FIG. 3 a view of the deflection part of the instrument according to FIG. 2.

In accordance with the intended use, the display 7 can be fixed to part of the rigid casing 8 of the instrument 9 shown in exemplified manner in FIG. 2. However, the instrument 9 can also be connected via a connecting line 10 to a remote display 7, e.g. located in a central control room and for this purpose digital data transmission is particularly advantageous.

The high precision possible through the digital evaluation of the frequency changes to the RC oscillators however, only leads to a correspondingly high measuring accuracy if the influences of faults are largely avoided. Therefore the problem of the preferred embodiments of the invention is to find constructional measures in order to eliminate to the greatest possible extent the influences of faults, particularly caused by temperature changes and dissipated capacitances.

The changes, e.g. in the temperature range −60° C. to +70° C. acting directly on the oscillators 4,5, can be taken into account in computer 6, in that the latter additionally receives a frequency $f_K$, which is independent of the acceleration forces, from at least one further RC oscillator 11 with otherwise identical specifications. Thus, it is possible to distinguish frequency changes of the RC oscillators 4,5 due to general influences, e.g. temperature changes from frequency changes, which are caused by the position change of the deflection part 1 between electrode plates 2,3 essential for the measurement.

In order to reduce a temperature influence on the oscillating behaviour of the RC oscillators 4,5, the deflection part 1 made from a thin metal plate 12 with a thickness of e.g. 0.08 mm is in direct contact with the also metallic casing 8, in that it is soldered thereto and has the same thermal expansion coefficient $f_M$ as the casing, or both are made from the same material, e.g. brass.

In order to prevent any change in the width of the gap 14,15 between the deflection part 1 and the electrode plates 2,3 in the case of a temperature change, said gap width in a ratio of $f_E - f_M$: $f_M$ is smaller than the spacing or its thickness formed by the insulating spacers 16,17, $\epsilon_E$ being the thermal expansion coefficient of spacers 16,17 and $\epsilon_M$ that of the casing 8, or the thickness of the spacers 16,17 is calculated on the basis of this ratio starting from a predetermined width of gap 14,15. Casing 8 has two parts 18,19 with parallel inner faces 20,21, to which are bonded planar spacers carrying the electrode plates 2,3, and a circular outer edge 22 of the deflection part 1 is enclosed between the parallel end faces of oppositely directed casing areas 23,24 projecting in cup rim-like manner over the casing inner faces 20,21.

The fixed metallic connection with the casing parts 18,19 is acquired by the deflection part 1 by radial extensions 25 of its outer rim 22, in that the latter projects into a circumferential groove 26 between the casing parts 18,19 and soldered there with the two casing parts 18,19 by not shown soldering material filling the said groove 26.

In order to facilitate the precise central fitting of the circular deflection part 1 relative to the circular inner faces of casing areas 23,24, on the circumference of one of said end faces of casing areas 18,19 are provided at least three at least approximately axially parallel directed bores 27, in which are inserted guide pins, so that on applying the deflection part 1 to said end face they engage on the circular outer rim 22 of deflection part 1 and guide the same. After fixing deflection part 1 to casing part 18, e.g. by zonal soldering, it is possible to remove again the not shown guide pins.

The precise central arrangement of the circular electrode plates 2,3 relative to the circular inner, faces of the casing areas 23,24 and relative to the deflection part also necessary for measuring accuracy reasons can be achieved in different ways. For example, the electrode plates are centered by the circular inner faces, in that they initially have a diameter extending up to them and after bonding to the spacer 16,17 are worked to the necessary diameter by means of a cutting tool. In a preferred embodiment, the electrode plates have a centrally shaped on, e.g. hollow cylindrical extension 29,30, which fits into a central opening 30 of the adjacent spacer and the latter, in accordance with FIG. 5, has a projecting hub part 31, which is centered in a central bore 32 of a casing wall having one of the inner faces 20,21.

Figure 4:
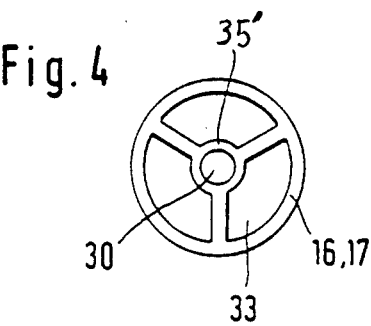
FIG. 4 a view of an insulating spacer for the instrument according to FIG. 2.

In order to obtain an improved insulation with respect to extraneous or dissipated capacitances, the spacers 16,17 preferably enclose larger cavities 33, so that they support the electrode plates 2,3 only in support rib-like manner on the casing inner faces 20,21. FIG. 4 shows a suitable spoked wheel-like embodiment.

In a preferred embodiment of the instrument, in which the electronic means 35 are only fitted to one casing part 18 and the electrical connection of the electrode plates 2,3 thereto takes place by central wire 34, the central opening 30 in the hub-like central part 35 of spacer 16 or 17 is used for the passage of wire 34, as well as the centrally shaped on extension 29,30 of electrode plates 2,3. The passage of extension 29 and wire 34 through opening 28 in the casing part 19 remote from the electronic means 35 in the outwards direction, serves to permit the easier formation of a soldered joint 36 between them. The equiaxial opening 41 in the facing casing part 18 carrying the electronic means 35 and the opening 41' in the printed circuit board 55 permits the central electrical connection of electrode plate 3 to said electronic means 35.

The central electrical connection through central openings 37,38,39 in electrode plates 2,3 and deflection part 1 also makes a significant contribution to avoiding any effect of extraneous capacitances, in that an electrical connecting wire led passed the capacitors 4,5 or the electrode plates 2,3 and deflection part 1 would form an extraneous capacitance. Moreover, this central electrical connection considerably facilitates an embodiment of the instrument, in which a metal cover 40 in earth or ground contact with the metallic casing 8 shields the electronic means 35 against electrical interfering fields.

Figure 5:
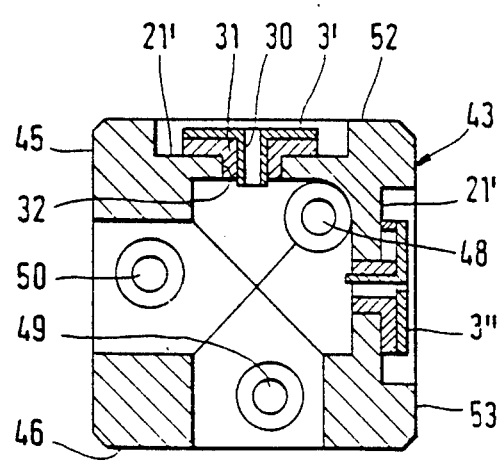
FIG. 5 a cross-section through a casing block for two instruments.

The one-sided arrangement of the electronic means 35 on one of the casing parts 18 also has the advantage that the facing side of the casing 8 remains free from such means and consequently can have a solid, shaped-on reference block 42 or 43 on which are located one (FIG. 2) or several (FIG. 5) reference faces 44,45,46 for angular measurement purposes. It is also possible to provide on reference block 42 or 43 fastening means, e.g. screw holes 47-50, so as to be able to fix the instrument in stationary manner on a body to be monitored with respect to its angular position or deformation, such as e.g. a component on high-rise buildings, production equipment, ships, etc., FIG. 5 shows an embodiment of a reference block 43 which, for angular measurement in two planes at right angles to one another, has two reciprocately correspondingly arranged electrode plates 3',3" of two not completely shown inventive instruments. As described hereinbefore relative to the embodiment of FIG. 2, the deflection part 1 is held between two end faces of casing areas 23,24 of two casing parts 18,19. The outer faces 52,53 in each case form one of these end faces in the embodiment according to FIG. 5.

The measuring accuracy is also increased by a particularly easily resiliently deflectable construction of the deflection part 1, in that its circular part forming the active inner area 13 is connected by at least three bands 55-57 surrounding the same in the form of an Archimedean spiral of more than 360° to its outer rim 22 fixed between the casing parts 18,19. The spiral bands are produced in one piece with the deflection part 1, in that e.g. several correspondingly directed spiral separating lines are formed by photoetching normally used for the production of printed conductors.

What is claimed is:

1. An instrument for measuring acceleration, comprising:
 a circular, metallic deflection part having a hole defined through its center;
 two electrode plates having a hole defined through their centers;
 a common casing having two parts, said deflection part held in a spring-elastic, membrane-like spaced manner between said two electrode plates and said deflection part and said two electrode plates in turn being placed between said two parts of said common casing, said deflection part and said electrode plates forming two adjacent capacitors;
 an electrical connecting wire; and
 electronic means for measuring acceleration in response to changes in capacitance of said capacitors;
 wherein said capacitors are electrically connected to said electronic means, and said electrical connecting wire is passed in a contact-free manner through said central hole in said deflection part and through holes in both electrode plates, said wire connecting the electrode plate more remote from the electronic means to the electronic means.

2. An instrument according to claim 1, wherein at least one RC oscillator is provided for computational temperature compensation and which, as a reference oscillator, has a constant oscillating frequency.

3. An instrument according to claim 1, wherein to the part of a metallic instrument casing forming the electrical grounding carrying the electronic means is fixed with electrical contact a metallic cover surrounding said means, the other part of the metallic casing forming a casing block, on which are provided fastening means and/or a reference surface for angular measurments.

4. An instrument for measuring acceleration as claimed in claim 1, further including two additional electrode plates and an additional deflection part disposed therebetween and supported by said common casing, said additional deflection part being arranged perpendicular to the first-mentioned deflection part.

5. An instrument for measuring acceleration, comprising:
   a circular, metallic deflection part having a hole defined through its center;
   two electrode plates having a hole defined through their centers;
   a common casing having two parts, each part having openings defined therethrough to the outside thereof, said deflection part being held in a spring-elastic, membrane-like spaced manner between said two electrode plates, and said deflection part and said two electrodes in turn being placed between two parts of a common casing, said deflection part and said electrode plates forming two adjacent capacitors;
   at least one electrically conducting extensions located adjacent to and at right angles to said central holes of said electrode plates, said at least one extension passing through opening defined in said common casing;
   an electrical connecting wire; and
   electronic means for measuring acceleration in response to changes in capacitance of said capacitors;
   wherein said capacitors are electrically connected to said electronic means, and said electrical connecting wire is passed in a contact-free manner through said central hole in said deflection part and through holes in both electrode plates, through said at least one electrically conducting extension, and through said opening of one part of said common casing, where said wire is soldered to the extension on the electrode plate more remote from the electronic means to connect to the electronic means.

6. An instrument for measuring acceleration, comprising:
   a circular, metallic deflection part having a hole defined through its center;
   two metallic electrode plates having a hole defined through their centers;
   a metallic common casing having two parts;
   insulating spacers, said deflection part held in a spring-elastic, membrane-line spaced manner between said two electrode plates, said electrode plates being positioned between and spaced from said two casing parts by said insulating spacers, said deflection part and said electrode plates forming two adjacent capacitors; and
   electronic means for measuring acceleration in response to changes in capacitance of said capacitors;
   whereby in situations where the deflection part is not deflected and only temperature changes are considered, the spacing between the electrode plates and said deflection part remains constant, even after temperature changes, by virtue of said spacing forming the ratio $\ell_E - \ell_M : \ell_M$ to the thickness of spacers, $\ell_E$ corresponding to the thermal expansion coefficient of the insulating material of the spacers and $\ell_M$ corresponding to the thermal expansion coefficient of the metallic casing.

7. An instrument according to claim 6, wherein the insulating spacers have recesses or cavities.

8. An instrument according to claim 7, wherein the insulating spacers are shaped like a spoked wheel with at least three spokes.

9. An instrument for measuring acceleration, comprising:
   a circular, metallic deflection part having a hole defined through its center;
   two electrode plates having a hole defined through their centers;
   a common casing having two parts, each part having openings defined therethrough to the outside thereof, said deflection part being held in a spring-elastic, membrane-like spaced manner between said two electrode plates, and said deflection part and said two electrodes in turn being placed between two parts of a common casing, said deflection part and said electrode plates forming two adjacent capacitors;
   at least one electrically conducting tubularly shaped extensions located adjacent to and at right angles to said central holes of said electrode plates, said at least one extension passing through opening defined in said common casing;
   an electrical connecting wire;
   an insulating spacer, said insulating spacer shaped like a spoked wheel with a central hub, said tubularly shaped extension passing through said central hole, and thereby centering said electrode plate having said tubularly shaped extension with respect to said spacer; and
   electronic means for measuring acceleration in response to changes in capacitance of said capacitors;
   wherein said capacitors are electrically connected to said electronic means, and said electrical connecting wire is passed in a contact-free manner through said central hole in said deflection part and through holes in both electrode plates, through said at least one electrically conducting extension, and through said opening of one part of said common casing, where said wire is soldered to the extension on the electrode plate more remote from the electronic means to connect to the electronic means.

10. An instrument for measuring acceleration, comprising:
    a circular, metallic deflection part having a hole defined through its center, said deflection part being spirally surrounded by at least three bands in an angular range of more than 360°, said bands being connected to a circular outer rim, the deflection part, the bands and the outer ring being shaped from common metal foil and lying in a single plane;
    two electrode plates having a hole defined through their centers;
    a common casing having two parts, said deflection part held in a spring-elastic, membrane-like spaced manner between said two electrode plates and said outer rim connected to said deflection part being fixed between the two casing parts, said deflection part and said two electrode plates being placed between said two parts of said common casing, said deflection part and said electrode plate forming two adjacent capacitors; and electronic means for measuring acceleration in response to changes in capacitance of said capacitors;

wherein said capacitors are electrically connected to said electronic means, and said electrical connecting wire is passed in a contact-free manner through said central hole in said deflection part and through holes in both electrode plates, said wire connecting the electrode plate more remote from the electronic means to the electronic means.

11. An instrument according to claim 10, wherein the circular outer rim surrounding the deflection part is held between circular, planar rims of the two casing parts so as to engage on the same and projections projecting radially from the outer rim project into a circumferential groove formed between the casing parts, the latter being formed from the same metallic material or a material with the same thermal expansion coefficient as the deflection part and the extensions are soldered to the casing parts within said circumferential groove.

12. An instrument according to claim 1 for measuring acceleration, comprising:

two circular, metallic deflection parts having a hole defined through their centers;

a common casing having a plurality of parts, said two pairs of adjacent capacitors being positioned offset to each other at 90° to the outside surface of one of said common casing parts; and electronic means for measuring acceleration in response to changes in capacitance of said two pairs of capacitors.

13. An instrument for measuring acceleration as claimed in claim 12, further including two additional electrode plates and an additional deflection part disposed therebetween and separated by said common casing, said additional deflection part being arranged perpendicular to the said other deflection parts.

* * * * *